F. HODGKINSON.
STERN TUBE FOR SHIPS.
APPLICATION FILED NOV. 24, 1917.
1,323,474.
Patented Dec. 2, 1919.
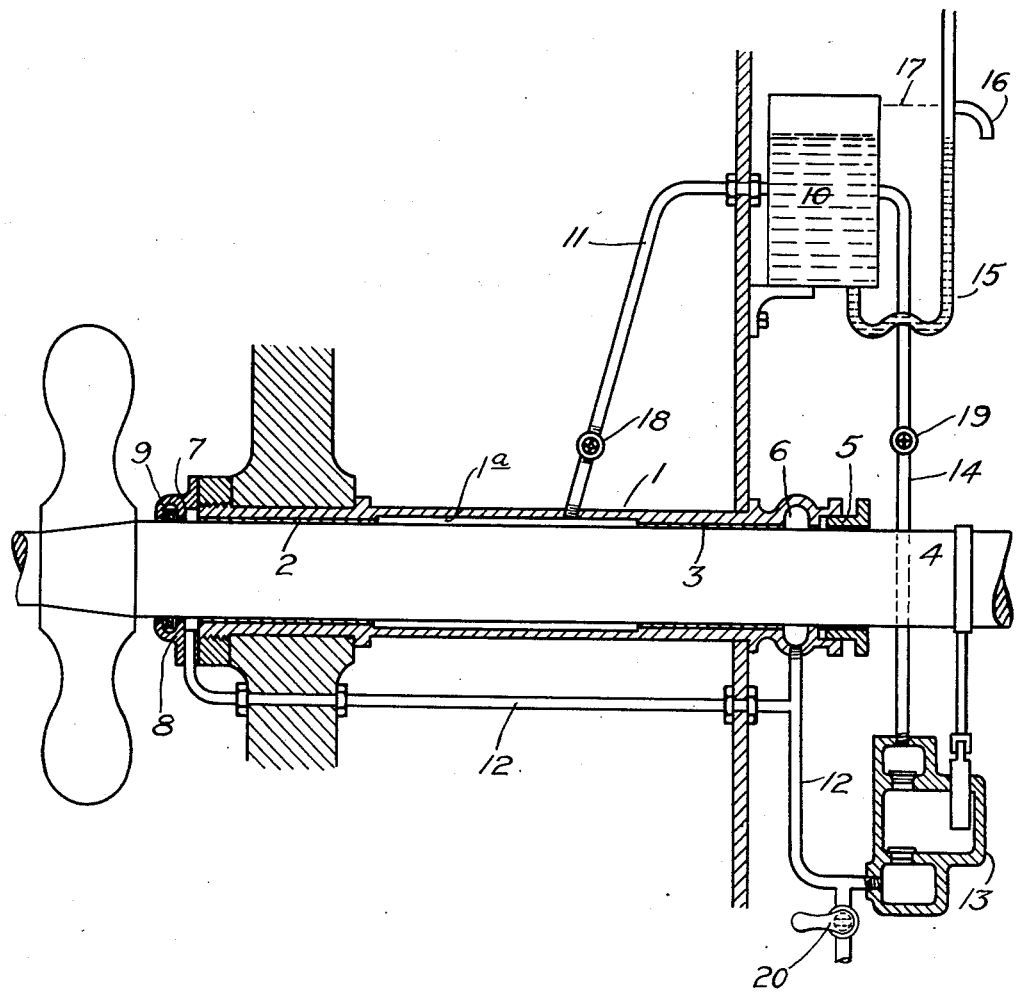
WITNESSES:
INVENTOR.
BY Francis Hodgkinson
ATTORNEYS.

UNITED STATES PATENT OFFICE.

FRANCIS HODGKINSON, OF EDGEWOOD, PENNSYLVANIA, ASSIGNOR TO WESTINGHOUSE ELECTRIC & MANUFACTURING CO., A CORPORATION OF PENNSYLVANIA.

STERN-TUBE FOR SHIPS.

1,323,474.  Specification of Letters Patent.  Patented Dec. 2, 1919.

Application filed November 24, 1917. Serial No. 203,853.

*To all whom it may concern:*

Be it known that I, FRANCIS HODGKINSON, a subject of the King of Great Britain and Ireland, and a resident of Edgewood, in the county of Allegheny and State of Pennsylvania, have made a new and useful Invention in Stern-Tubes for Ships, of which the following is a specification.

This invention relates to stern tubes and particularly to means for lubricating the propeller bearings located in or forming a part of such tubes.

A further object is to provide a new and improved stern tube in which means are employed whereby the shaft bearings located within or forming a part of the stern tube may be lubricated with oil.

A further object is to produce a stern tube in which means are provided for preventing undue waste of lubricant delivered to the bearings forming a part of the stern tube.

These and other objects are attained by means of a stern tube forming the features herein described and illustrated.

It is usually customary for the stern tubes of ships to be provided with a bearing at each end for supporting the propeller shaft which projects through the tube. It is customary to provide for water lubrication of these bearings, since heretofore, the delivery of oil to the bearings would occasion undue waste of oil. The practice of lubricating the stern tubes with water is unsatisfactory, because water is an imperfect lubricant and because the wear on the bearings is often accelerated by the fact that the water contains grit. The rapid wearing of the bearings of the stern tube leaves the projecting end of the propelling shaft unsupported and therefore causes undue vibrations and undue loading of the adjacent inboard bearing which, because it is properly lubricated, is not worn to the same extent as the stern tube bearings.

In the drawings accompanying and forming a part hereof I have diagrammatically illustrated an embodiment of my invention which overcomes difficulties ordinarily encountered with the bearings of stern tubes.

Referring to the drawings: The stern tube or casing 1 projects through the stern of the vessel and is provided at its opposite ends with bearings 2 and 3, in which the propeller shaft 4 is mounted. The bearings 2 and 3 may be constructed of any suitable anti-friction metal and are provided with suitable oil grooves. At the inner end of the tube I have illustrated the customary gland 5, which is adapted to pack the joint between the tube and the propeller shaft. Whether this gland is furnished or not, I provide an annular recess just within the tube which forms an annular chamber around the propeller shaft, and between it and the tube. This chamber is preferably formed, as illustrated, immediately adjacent to the bearing 3. I also provide a similar chamber 7 at the propeller end of the tube. This chamber is preferably located immediately adjacent to, but on the rear side of, the outboard bearing 2. As illustrated, the chamber 7 is provided in a cap 8 which forms a part of the casing 1 and which is screwed or otherwise secured to the outer end of the tube or casing 1 and surrounds the propeller shaft. If desired, the cap 8 may be provided with a cavity in which a floating ring 9 is located. The floating ring, when employed, is preferably of such metal or such composition as will operate satisfactorily with water lubrication only. It will be understood that the floating ring 9 is adapted to restrict the flow of water into the stern tube or casing and consequently it may be replaced by strips, formed integrally with the stern tube or otherwise secured thereto, which project into close proximity with the propeller shaft and therefore reduce ingress of water by reason of the small clearances between them and the shaft.

As is customary, the tube or casing 1 is so formed as to provide an annular space 1ᵃ between the bearings 2 and 3, which form a lubricant delivery space for the bearings and, as illustrated, communicates with a lubricant supply tank 10 through a pipe or passage 11. Both the chambers 6 and 7 are connected by means of piping or passages 12 to a pump 13, which may be of any suitable type, but is preferably a slow operating pump. The pump 13 may be so connected that it may be operated directly from the propeller shaft or it may be separately operated or be capable of separate operation, if desired.

While the pump 13 is in operation, it withdraws lubricant discharged from the bearings 2 and 3 into the chambers 6 and 7 and delivers the same to the tank 10, which is located above the pump and the stern tube 1. The pump will have a capacity in excess of that required for pumping the amount of oil passing the bearings so that it will be capable of also removing water which leaks past the packing 9. In fact the capacity of the pump is such that it is not only capable of removing the oil discharged from the bearings, but is also capable of completely emptying the chambers 6 and 7 under all conditions of reasonable water leakage through the packing device 9. This water will enter the chamber 7 and will be delivered with the oil to the tank 10. I have shown the delivery piping 14 of the pump communicating with the tank 10 at a point midway up the tank. The oil delivery piping 11 also communicates with the tank at a point about midway up and I have indicated the oil level in the tank as being somewhat above the connections to which I have just referred. I have also illustrated drain-off piping as communicating with the bottom of the tank and extending upwardly somewhat above the normal oil level within the tank but below the upper limits of the tank. With this arrangement water will drain off from the tank through a connection 16 when the fluids within the tank reach an elevation such as 17.

It will be apparent that lubricant delivered from the tank 11 to the intermediate space 1ᵃ between the stern tube bearings 2 and 3, will be distributed to the bearings. The excess oil escaping from the bearings will be delivered to either the cavity 6 or 7, and will be withdrawn by the pump and forced into the tank 10 with the water which is drawn in through the outer end of the stern tube. By providing the pump of sufficient capacity to occasion an inward flow through the outer end of the tube no lubricant will be wasted but substantially all the lubricant will be returned with the water to the tank 10. The tank will be of sufficient size to permit the oil and water to separate, and it may be necessary to provide a heating coil for the tank for accelerating the separation if the pump is of such type as to occasion a too intimate mixture of the water and the lubricant.

In the apparatus illustrated the pump will shut down when the propeller is not in operation. If the tank 10 is below the surface of the outside water, outside water will gradually fill the stern tube and overflow through the discharge connection 16 of the tank. If the tank is located above the level of the outside water it will be desirable to provide a valve 18 in the oil delivery piping 11 and a valve 19 in the piping 14. These valves will be closed only when the pump 13 is not in operation and will therefore prevent lubricant from being forced, by its static head, out through the tube into the outside water. Upon starting up the propeller and consequently the pump 13 these valves will be opened and it may be desirable to provide a drain tap 20 in the piping 12 so as to drain out the water within the stern tube before the valve 18 is opened. Where the pump 13 is capable of being operated independently of the propeller shaft the pump may be started before the propeller shaft and in this way the proper circulation of water through the stern tube may be established before lubricant is delivered through the pipe 11.

While I have described and illustrated but one embodiment of my invention, it will be apparent to those skilled in the art that various changes, modifications, substitutions, omissions and additions may be made in the apparatus illustrated without departing from the spirit and scope of the invention, as set forth by the appended claims.

What I claim is:

1. A stern tube for propeller shafts, comprising a casing through which the shaft projects, a shaft bearing located within the casing, means for delivering lubricant to said bearing, the casing having an annular chamber located between the bearing and the end of the casing, and means for withdrawing from said chamber leakage from the bearing or through the end of said casing.

2. A stern tube for propeller shafts, comprising a casing through which the shaft projects, a bearing for the shaft located within said casing, means for delivering lubricant to said bearing, the casing having an annular chamber surrounding the shaft and located between said bearing and the end of the casing, a pump for withdrawing liquid leaking into said chamber, from said bearing or through the end of said tube.

3. A stern tube for propeller shafts, comprising a casing through which the propeller shaft projects, a bearing for the shaft within said casing, means for delivering lubricant to said bearing, the said casing having a chamber surrounding the shaft and located between said bearing and the outer end of said casing, leakage restricting means located between the chamber and the outer end of of the casing, and means for emptying said chamber of liquid leaking through said last mentioned means or from said bearing.

4. A stern tube for a propeller shaft, comprising a casing through which the propeller shaft projects, a bearing for the shaft located within said casing, the casing having a chamber surrounding the shaft and located between the bearing and the outer end of the casing, in combination with a pump for withdrawing leakage liquid from said chamber, a tank to which said liquid is delivered by said pump, and means communicating with said tank for delivering lubricant to the bearing of said tube.

5. A stern tube for a propeller shaft, comprising a casing through which the shaft projects, a shaft bearing located within the casing, the casing having a chamber surrounding the shaft and located adjacent the bearing and between said bearing and the outer end of said casing, and means for creating an inward flow of water through the outer end of the tube and into said chamber.

6. A stern tube for a propeller shaft, comprising a casing through which the shaft projects, a bearing for the shaft within the casing, means for delivering lubricant to said shaft, the said casing having a chamber surrounding said shaft and located adjacent said bearing and between the bearing and the outer end of said casing for receiving lubricant from said bearing, and a packing between the outer end of said casing and said chamber, in combination with a pump for withdrawing lubricant and water leaking into said chamber, a separating tank into which said pump discharges, and a water overflow communicating with said tank.

7. A stern tube for a propeller shaft, comprising a casing through which the shaft projects, a bearing for the shaft at each end of said casing, means for delivering lubricant to both said bearings, the casing having chambers surrounding said shaft, each being located adjacent one of said bearings and between the bearing and the adjacent end of the casing, in combination with a pump for withdrawing leakage liquid from said chambers, a tank to which said liquid is delivered by said pump and a water overflow communicating with said tank.

8. A stern tube for a propeller shaft, comprising a casing through which the shaft projects, a bearing for the shaft located within the casing, the casing having a chamber surrounding the shaft, located adjacent said bearing and between the bearing and the outer end of the tube, in combination with a pump for withdrawing leakage liquid from said chamber, a tank into which said pump discharges, means for delivering lubricant from said tank to said bearing and means for closing off communication between said tank and said casing.

9. The combination with a marine propeller shaft and a stern tube provided with a bearing, of a means including an oil and water separator for supplying oil to the said bearing, a means for collecting the oil and water leaking through the tube, and a means for delivering the collected oil and water to the separator.

10. The combination with a boat propeller shaft, a stern tube provided with a bearing, and a means for supplying oil to the said bearing adapted to force oil through the bearing toward the outer end of the tube, of a means for collecting the oil passing the bearing and the water entering the tube, and means for delivering the collected oil and water to the interior of the boat.

11. The combination with a marine propeller shaft and a stern tube provided with a bearing, of an oil circulating means including an oil and water separator adapted to pass oil through the bearing toward the outer end of the tube and return the oil passing the bearing and the water entering the outer end of the tube to the said separator.

12. The combination with a marine propeller shaft and a stern tube provided with a bearing, of an oil circulating means including an oil and water separator adapted to force oil through the bearing and return the oil passing the bearing and the water entering the outer end of the tube to the said separator.

13. The combination with a boat propeller shaft and a stern tube provided with bearings at the inner and outer ends thereof, of an oil circulating means adapted to supply oil to the tube between the bearing and return the oil passing through the bearings to the interior of the boat.

14. The combination with a marine propeller shaft and a stern tube provided with a bearing at the inner and outer ends of the tube, of an oil circulating means including an oil and water separator adapted to supply oil to the tube between the bearings and return the oil passing the bearings and the water entering the outer end of the tube to the said separator.

In testimony whereof, I have hereunto subscribed my name this 22nd day of November, 1917.

FRANCIS HODGKINSON.

Witness:
C. W. McGhee.